United States Patent
Bendel et al.

(10) Patent No.: US 10,452,682 B2
(45) Date of Patent: Oct. 22, 2019

(54) ACCELERATOR BASED DATA INTEGRATION

(71) Applicant: International Business Machines Corporation, Armonk, NY (US)

(72) Inventors: Peter Bendel, Holzgerlingen (DE); Oliver Benke, Stuttgart (DE); Namik Hrle, Boeblingen (DE); Ruiping Li, San Jose, CA (US); Daniel Martin, Stuttgart (DE); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 15/398,956

(22) Filed: Jan. 5, 2017

(65) Prior Publication Data

US 2018/0189370 A1     Jul. 5, 2018

(51) Int. Cl.

| | |
|---|---|
| *G06F 16/27* | (2019.01) |
| *G06F 16/2453* | (2019.01) |
| *G06F 16/22* | (2019.01) |
| *G06F 16/2455* | (2019.01) |

(52) U.S. Cl.
CPC .......... *G06F 16/27* (2019.01); *G06F 16/2282* (2019.01); *G06F 16/2453* (2019.01); *G06F 16/2455* (2019.01)

(58) Field of Classification Search
CPC .. G06F 16/27; G06F 16/2435; G06F 16/2282; G06F 16/2455; G06F 16/2453
See application file for complete search history.

(56) References Cited

U.S. PATENT DOCUMENTS

| | | |
|---|---|---|
| 5,497,486 A | 3/1996 | Stolfo et al. |
| 6,182,202 B1 * | 1/2001 | Muthukkaruppan ........................ G06F 9/3016 711/212 |
| 6,418,426 B1 * | 7/2002 | Schlesinger .......... G06F 16/282 707/610 |
| 8,244,718 B2 | 8/2012 | Chamdani et al. |
| 8,788,453 B2 | 7/2014 | Bakalash et al. |

(Continued)

OTHER PUBLICATIONS

Wikipedia, "Data Integration," https://en.wikipedia.org/wiki/Data_integration, 2016, pp. 1-8.

(Continued)

*Primary Examiner* — Jay A Morrison
(74) *Attorney, Agent, or Firm* — Winstead, P.C.

(57) ABSTRACT

A method, system and computer program product for providing consolidated access to data of a plurality of source databases. Tables of each of the source databases are replicated to a shared accelerator. The source DBMSs are configured to dispatch queries to the accelerator for accelerating query execution. The accelerator is configured such that the replicated tables can only be accessed by the source DBMS having provided said tables for executing a dispatched query. A user can select one of the source DBMSs to act as a consolidated DBMS—C-DBMS. The C-DBMS provides the consolidated access. The user is enabled to select tables managed by another one of the DBMSs. In response to receiving the selection of the tables, the accelerator is re-configuring such that the C-DBMS is granted access also to the copies of the selected tables in the accelerator.

20 Claims, 4 Drawing Sheets

(56) References Cited

U.S. PATENT DOCUMENTS

| | | |
|---|---|---|
| 8,825,604 B2 | 9/2014 | Draese et al. |
| 2001/0029502 A1 | 10/2001 | Oeda |
| 2011/0289055 A1* | 11/2011 | Pothering ............... G06F 16/27 707/626 |
| 2015/0271009 A1 | 9/2015 | Clothier et al. |
| 2016/0210316 A1 | 7/2016 | Bendel et al. |
| 2017/0171214 A1* | 6/2017 | Anderson ............... G06F 16/27 |

OTHER PUBLICATIONS

Wikipedia, "Federated Database System," https://en.wikipedia.org/wiki/Federated_database_system, 2016, pp. 1-6.

Wikipedia, "Data Virtualization," https://en.wikipedia.org/wiki/Data_virtualization, 2016, pp. 1-4.

George Davies, Jr., "Smart Consolidation for Smarter Warehousing," Jun. 2011, pp. 1-28.

List of IBM Patents or Patent Applications Treated as Related, Oct. 23, 2018, pp. 1-2.

Office Action for U.S. Appl. No. 16/168,220 dated Feb. 14, 2019, pp. 1-22.

\* cited by examiner

ACCELERATOR BASED DATA INTEGRATION

TECHNICAL FIELD

The present invention relates generally to data processing, and more particularly to integrating distributed data stored in multiple different data sources.

BACKGROUND (Large) enterprises manage a rapidly increasing volume of information for optimizing production and distribution processes, for evaluating compliance and customer satisfaction, or for managing staff-related data. Often, many different systems are used for managing data, and the data is distributed over many different distributed sources. Often, however, a "global", "consolidated" or "holistic" view on the available data is necessary.

According to some prior art approaches, the data of many different data sources is copied and stored into a single (virtual/logical) data warehouse for easy, centralized access. Typically, Extract, Transform, Load (ETL) tools are used for extracting the data from the many data sources, transforming the extracted data into a common data format, and for loading the formatted data into a central database management system. Building a Data Warehouses thus typically requires the definition of a common data model and is a complex endeavor. However, using a Data Warehouse for providing a central, consolidated data access has many drawbacks: the data needs to be replicated to the data warehouse. Typically, the data is replicated over a network, e.g. the internet or an intranet. Thus, any changes in the data sources are replicated to the data warehouse with some delay. This may result in inconsistencies and the acquisition of advanced (and often expensive) data warehouse management technologies may be necessary. Moreover, the data transfer from the source system to the data warehouse generates a significant amount of network traffic and consumes processing power.

Alternatively, federated database systems are used for providing a single, consolidated view of the available data. A federated database system is a type of meta-database management system (DBMS), which transparently maps multiple autonomous database systems into a single federated database. The constituent databases are interconnected via a computer network and may be geographically decentralized. A federated database, or virtual database, is a composite of all constituent databases in a federated database system. In contrast to the data warehouse approach, the data of the data sources is not copied into a central repository. Thus, there is no actual data integration in the constituent disparate databases as a result of data federation. Rather, federated database systems provide a uniform user interface through mapping and abstraction of data structures, thereby enabling users and clients to store and retrieve data from multiple noncontiguous databases with a single query. To this end, a federated database system must be able to decompose the query into sub-queries for submission to the relevant constituent DBMSs, after which the system must composite the result sets of the sub-queries. Because various database management systems employ different query languages, federated database systems require wrappers to translate the sub-queries into the appropriate query languages. They are very sensitive to structural changes in the source databases and thus are often considered as inflexible and costly to maintain. For example, in case the structure of some data tables in a source database is changed or in case a DBMS with a different SQL dialogue is used as a new data source, also the mapping that generates the abstract layer needs to be changed. Moreover, the organization of the data in some or all of the source databases may not be suited for efficient query execution if the query is an analytical query covering many different data sources.

SUMMARY

In one embodiment of the present invention, a computer-implemented method for providing consolidated access to data of a plurality of source databases comprises replicating, by a processor, one or more tables of each of the source databases to a shared accelerator, each of the source databases being managed by a respective source DBMS configured to dispatch queries to the shared accelerator for accelerating the execution of the dispatched queries by executing the queries on the replicated table copies rather than on the tables in the respective source database, the accelerator being configured such that the replicated tables of the source databases can only be accessed for executing a dispatched query by the one of the source DBMS which has provided the replicated tables. The method further comprises receiving a user's selection of a first one of the source DBMSs, the selected first source DBMS to be used as a consolidated DBMS—C-DBMS—for providing the consolidated access. The method additionally comprises receiving a user's selection of one or more of the tables managed by a second one of the source DBMSs. Furthermore, the method comprises in response to receiving the selection of the one or more tables, re-configuring, by the processor, the accelerator and the C-DBMS such that the C-DBMS is enabled to access also to the replicated copies of the one or more selected tables in the accelerator.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1A:
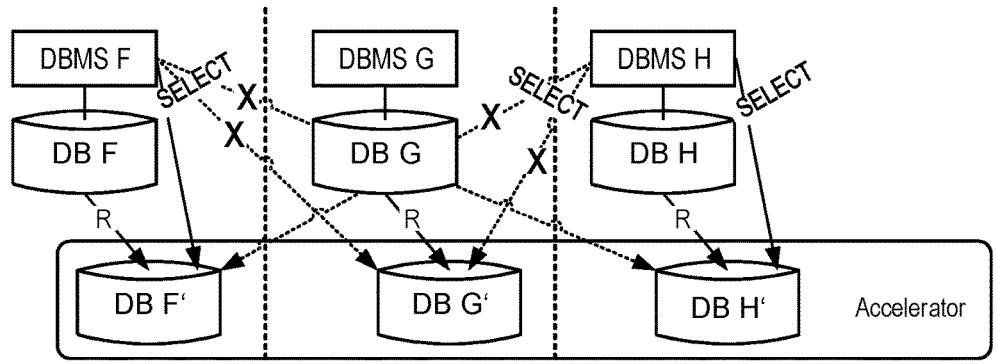
FIG. 1A depicts the isolation of multiple different source databases in an accelerator in accordance with an embodiment of the present invention.

Embodiments of the invention may have the beneficial effect that a central, consolidated view on data derived from many different data sources is provided without increasing network traffic. This effect may be achieved by using an accelerator shared by multiple data sources as a kind of "data warehouse".

Accelerators are database management systems (DBMSs) which are particularly suited for quickly performing database queries of a particular type, e.g. analytical queries. Accelerators are used for copying data of a source database completely or partially into an accelerator and for increasing query performance. A source database receiving a query may dynamically decide whether the received query is executed in the source database or is dispatched to the accelerator. The question if a query is dispatched or not depends on the type of the query. A query will only be dispatched in case the source database determines or predicts that the received query will be executed faster on the accelerator than on the original data tables in the source database. Thus, accelerators have been developed for and are used for accelerated query execution. Accelerators have not been used and have not been designed for integrating data. In particular, the data provided by a data source to a state of the art accelerator was typically isolated (i.e. access protected) from any other DBMS that might also provide data to the accelerator for increasing its performance.

Thus, by re-configuring the data isolation logic of the accelerator, a client may access the data provided by many different source databases via a single central access point provided by the accelerator. As the data is copied from the source databases to a central, shared accelerator for increasing query performance anyway, it is not necessary any more to perform an extra-copy step for copying the data to a central data warehouse for providing a consolidated, central access to the data of the data sources.

Thus, by making use of (and re-configuring) a technical system (an accelerator) that was originally developed for query acceleration and dispatching, not for data integration, a consolidated, central access may be provided to the data of a plurality of source databases without any additional data replication step. The source data in the accelerator can transparently accessed from one or more clients via a "target" or "consolidated" or "C-" database. Re-configuring an accelerator is computationally much cheaper than copying data to a further repository for providing consolidated central data access means.

According to embodiments, the replication of the one or more tables of the plurality of source databases is performed automatically and regularly. For example, the replication logic can be a built-in replication logic of the accelerator or can be implemented in a separate, standalone replication management application program.

This may have the advantage that the automatic replication logic ensures that the data in the accelerator is up-to date.

According to embodiments, the replication of the one or more tables of the plurality of source databases is performed incrementally. This may reduce the amount of data that is regularly transferred from the source databases to the accelerator.

According to embodiments, the method further comprises receiving a user's selection of one or more of the tables managed by a third one of the source DBMSs. In response to receiving the selection of the one or more tables managed by the third DBMS, re-configuring the accelerator and the C-DBMS such that the C-DBMS is enabled to access also to the replicated copies of the one or more selected tables of the third DBMS in the accelerator.

Thus, the accelerator may comprise copies of one or more tables of a first source DBMS acting as the "consolidated" C-DBMS, comprise copies of one or more tables of a second source DBMS, and comprise copies of one or more tables of the third source DBMS. The accelerator may comprise table copies of one or more further source databases and thus may provide for a central data access point to a plurality of different source databases.

According to embodiments, a plurality of accelerators is shared by the source DBMSs for better performance and system reliability. The one or more tables of each of the source databases are replicated to each of a plurality of shared accelerators. Each of the source DBMSs is configured to dispatch queries to the one of the shared accelerators which is flagged as "available" or which is determined to have the lowest workload. Each of the accelerators is configured such that the replicated tables of the source databases in said accelerator can only be accessed for executing a dispatched query by the one of the source DBMS which has provided said replicated tables. In response to receiving the selection of the one or more tables, each of the shared accelerators is re-configured automatically or semi-automatically such that the C-DBMS is granted access also to the replicated copies of the one or more selected tables in said accelerator.

For example, a load balancing application program may constantly monitor the CPU and/or memory load and availability of each of the computer systems respectively hosting one of the shared accelerators. The load balancing application program repeatedly provides the determined status and load-related information to the C-DBMS for enabling the C-DBMS to dispatch any query that is to be executed on an accelerator on one of the accelerators that is available and a comparatively low workload, e.g. the accelerator currently having minimum load.

According to embodiments, at least a first one of the tables of the source database of the first source DBMS and at least a first one of the tables of the selected second source DBMS have the same table structure. The replication comprises copying data records of the at least one first table of the first DBMS and data records of the at least one first table of the second source DBMSs into the same table in the accelerator or into multiple tables in the accelerator sharing the same table structure. Each of the source DBMSs is configured to dispatch queries to the one of the shared accelerators which is flagged as "available" or which is determined to have the lowest workload. Each of the accelerators is configured such that the replicated tables of the source databases in said accelerator can only be accessed for executing a dispatched query by the one of the source DBMS which has provided said replicated tables. In response to receiving the selection of the one or more tables, re-configuring each of the shared accelerators such that the C-DBMS is granted access also to the replicated copies of the one or more selected tables in said accelerator.

For example, data records of different source databases which represent a particular, shared semantic concept, e.g. "employee", can be replicated into a single table in the accelerator having a table structure that fits to the attributes of the semantic concept or into multiple tables in the accelerator having a shared table structure that fits to the attributes of the semantic concept.

This may be particularly advantageous for providing a consolidated view on data tables having the same structure and being maintained by different source DBMS. For example, a global company may have subsidiaries in many countries. Each subsidiary may maintain its own source database comprising a table "employees" with a particular set of columns like ID, first-name, second-name, address, phone-number, etc. The structure of all employees table may be identical and only the data content may differ. By copying the data of many structurally identical source tables into the same table of the accelerator, global access to the data of all said tables can be granted to a client simply by dispatching the client's query to the accelerator and rewriting the query such that it accesses the single central "employees" table in the accelerator that comprises the data of many source database employees-tables.

According to embodiments, at least a second one of the tables of the source database of the first source DBMS and at least a second one of the tables of the selected second source DBMS have similar table structure. A "similar structure" can mean, for example, that one table comprises one or more columns in addition to the columns of the other table, or comprises basically the same number of columns and respective data types (INT, VARCHAR, BOOLEAN, etc.) but uses different column names, a different column order, etc.). The replication comprises copying data records of the at least one second table of the first DBMS and data records of the at least one second table of the second source DBMSs into one or more tables in the accelerator, the one or more tables having a particular table structure. Thus, in case multiple tables in the accelerator receive the data records, the multiple tables share said particular data structure. The copying comprises transforming the structure of the records of one or all of the at least two tables into the particular (shared) table structure.

For example, the employees tables of two different source databases may have a slightly different structure due to different address specification schemes in different countries. By performing a minor transformation of the data of one of the employees tables, the data of both source tables can be stored into a single table in the accelerator.

According to embodiments, the replication comprises copying data records of at least one third table of the first DBMS into a respective, structurally identical copy of said third table in the accelerator, and copying data records of the at least one third table of the second source DBMSs into a respective, structurally identical copy of said third table in the accelerator.

For example, a dispatched query may be configured to access and analyze an "employee" table comprising salaries-related data provided and a "consumables" table comprising prices of goods consumed in a production process. The employees table is provided as a copy by the first DBMS and the consumables table is provided as a copy by the second DBMS to the accelerator. The employees table and the consumables table may be very different in structure but may both be evaluated in a single, typically analytical query executed in the accelerator. For example, said query may be a query that aggregates costs for employees, consumables, and other items over a given time period. Thus, embodiments of the invention may provide a single central access point for data stored in many different tables of different formats in different source databases.

Thus, depending on the embodiments, each replicated table of the one or more source database may be stored in a respective table in the target system, whereby the system ensures that data records of different source tables in different source databases which represent the same semantic concept (e.g. data records representing "employees" or data records representing "orders") are stored either in a single accelerator table having a particular table structure for said semantic concept (e.g. "employee table structure" comprising a set of columns representing typical employee attributes or an "order table structure" comprising a set of columns representing typical order attributes) or are stored in multiple tables sharing the same table structure. For example, each employee table from three different source databases may be stored in a respective one of three accelerator-employee tables sharing the employee table structure. In some embodiments, the copying process comprises a transformation step to ensure that the structure of the copied data records fits to the structure of the receiving accelerator table. For example, an accelerator table to receive the data records can be created automatically by the distributed computer system or the replication module upon initially starting the replication process for a particular table in a source database. The C-DBMS then creates, automatically or in response to a user action, an "accelerator only" reference to the table having been created in the accelerator that has received the data records. The C-DBMS or a user then creates a view, e.g. a UNION ALL view in C-DBMS configured to retrieve, upon being called, data records from all structural identical tables in the accelerator a single query. In case the data records representing a particular, shared semantic concept which were received from different source databases are stored in a single accelerator table, the view may be configured to call only said single table.

According to embodiments, the computer-implemented method further comprises generating a view in the source database of the first DBMS. The view is configured to retrieve, upon being called, data records of two or more tables in the accelerator. Said two or more tables are derived from the first and the second DBMSs. The data record retrieval comprises performing an SQL operation on the table records of said two or more tables.

For example, the view can use a UNION ALL or INTERSECT SQL operation. In this case, the table copies in the accelerator accessed by said view preferentially have the same table structure. In case a table copy having the same table structure is received from one or more source databases which have also been marked by their owners as being "public" to queries directed to the C-DBMS, the UNION-ALL view is configured such that it selects and processes also data of the respective table copies of said one or more further source DBMSs. The data record retrieval comprises performing an SQL UNION or INTERSECT operation on the table records of said two or more tables.

For example, in case an owner of a source database marks some or all of the tables of the source database as being public to the C-DBMS, the UNION-ALL view is automatically rewritten such that it automatically selects and processes the data of all table copies which are stored in the accelerator, are "public" to the C-DBMS and have the same table structure. For example, the accelerator may comprise a mapping of accelerator table names representing tables having the same table structure.

According to embodiments, the accelerator is a DBMS optimized for quickly performing analytical database queries. Each of the source DBMSs is a DBMS optimized for quickly performing transactional database queries.

For example, the accelerator can be organized as an OLAP DBMS or as an in-memory, columnar DBMS while each of the source DBMSs can be organized as an OLTP DBMS.

This may be beneficial as data consolidation and accelerated query performance is achieved with basically the same IT framework that supports quick execution of OLTP queries (in particular, INSERT, UPDATE and DELETE queries) in each of the source DBMSs as well as quick execution of OLAP queries (in particular, large, complex SELECT operations covering many tables) in the accelerator. Thus, it is not necessary any more to use the same type of DBMS and query optimizer for performing different types of queries. Rather, a dispatcher module that is part of or interoperates with the C-DBMS evaluates every query received from a client, determines if the query is an OLTP query or an OLAP query, executes the OLTP Queries on the source database of the C-DBMS (solely on the data of said C-DBMS), and dispatches the OLAP queries to the accelerator for executing the OLAP queries on copies of database tables provided by many source databases which were "published" to the C-DBMS and copied to the accelerator. This may significantly increase performance.

According to embodiments, the accelerator is hosted on an interconnected assembly of multiple general purpose CPUs (which are part of the same computer system) or an interconnected assembly of multiple general purpose computer systems. Each of the source DBMSs is hosted on one or more server computers coupled to the accelerator via a network connection.

This may be beneficial as at least some of the queries which are dispatched to the accelerator may be parallelizable and may be performed faster on a multi-CPU architecture. Moreover, the C-DBMS may dispatch multiple queries received from the same or from multiple different clients to the accelerator for parallel execution on the plurality of CPUs. In a further beneficial aspect, the dispatched queries executed on the accelerator do not reduce performance of or consume CPU power of the server(s) hosting the source DBMSs.

In a further beneficial aspect, the above mentioned hardware architecture is particularly cheap as "general purpose CPUs", e.g. CPUs designed for the consumer market, may be used for executing the dispatched, analytical queries.

According to embodiments, the first DBMS comprises a first database catalog. The first database catalog comprises schema information of tables stored in the source database of the first DBMS. The second DBMS comprises a second database catalog comprising schema information of tables stored in the source database of the second DBMS. The re-configuration of the shared accelerator comprises supplementing the first database catalogue with schema information of the tables of the source database of the second DBMS which are replicated to the accelerator and to which access is granted to the C-DBMS. The supplemented schema information enables a database engine of the first DBMS to access also the replicated copies of the one or more selected tables in said accelerator.

The supplemented schema information may act as basis for rewriting queries which are dispatched to the accelerator such that they access the table copies of many source databases rather than just the table copies of the source database of the C-DBMS.

According to embodiments, the schema information of the tables of the source database of the second DBMS that supplements the first catalogue indicates that the replicated copies of the one or more selected tables in said accelerator are "accelerator only tables". An "accelerator only table" is a table represented and structurally described by an entry in the database catalogue of a source database, whereby said table exists in the accelerator but does not exist (also not as a copy) in the database whose database catalogue comprises said entry.

Storing the table copies of all other source databases (except for the source database of the C-DBMS) in the accelerator thus that the catalogue of the source database of the C-DBMS indicates said table to be "accelerator only" tables may be advantageous as accelerator systems already exist which support an "accelerator only" table type. Thus, it is not necessary to replicate the table copy in the accelerator a further time for copying it to the source-database of the C-DBMS.

a) According to embodiments, the first DBMS receives a query from a client application. The first DBMS analyzes the received query for predicting if the query can be executed quicker in the accelerator than on the tables of the source database managed by the first DBMS.

b) In addition, or alternatively, the first DBMS analyzes the received query for determining if the query accesses at least one table that is marked as an "accelerator only table".

c) In addition, or alternatively, the first DBMS analyzes the received query for determining if the query comprises a flag that it should be executed mandatorily on a consolidated set of source databases;

If any one of a), b) or c) returns TRUE, the C-DBMS or a dispatcher module operatively coupled to the C-DBMS dispatches the received query for execution to the accelerator. The accelerator executes the dispatched query on at least one copy of a table of the source database managed by the first DBMS and on at least one copy of a table of the source database managed by the second DBMS.

This feature may be advantageous as the query will be dispatched to the accelerator even in case the "standard" dispatching procedure would not dispatch the query to the accelerator and rather have it executed by the C-DBMS if the query comprises a "consolidated data" flag or is directed on at least one "accelerator only" table. Thus, a flexible mixture of queries which are dispatched for performance reasons and of queries which are dispatched for integrating data of multiple sources is provided.

For example, the accelerator may store the data records received from different tables of different source databases in separate tables. Thus, a query received by the C-DBMS can indicate via a flag or by direct table reference if the query should be executed selectively on data of the C-DBMS (either on the source database managed by the C-DBMS or on table copies of the source database of the C-DBMS stored in the accelerator) or on data provided by multiple different source databases (in this case the query must be dispatched for execution to the accelerator). The query may comprise a flag indicating if the query is a "conventional query" requesting data managed by the C-DBMS or a "consolidated query" requesting data consolidated from multiple databases. Another alternative for a "consolidated" query is a query that comprises a reference to a view (e.g. an UNION ALL view) stored in the C-DBMS, where the view definition one or more accelerator only tables and combines the data of said tables in a UNION ALL or JOIN or other operation.

According to embodiments, the accelerator comprises a mapping of first and second table names. The first table names are names T3' of the table copies stored in the accelerator. The second names are synonyms of the first table names. The synonyms are referenced by database catalogue records of the first DBMS. The dispatching comprises:

Analyzing the received query for identifying all first table names of the totality of tables to be accessed by the query;

accessing, by the first DBMS, a database catalogue of the first DBMS and the mapping for identifying the respectively mapped second table names;

rewriting the received query by replacing the first table names by their respectively mapped second table names; and dispatching the rewritten query for execution to the accelerator For example, the first namespace may comprise first names of base tables and "accelerator only" tables specified in the catalogue of the first DBMS.

According to some embodiments, the analysis of the received query, the accessing of the database catalogue of the accelerator and the rewriting of the received query is performed by the source DBMS used as the C-DBMS or by a program logic that is operatively coupled to the C-DBMS and/or the accelerator. For example, said program logic can be a stand-alone application or a plug-in of the C-DBMS or a plug-in of the accelerator. The dispatching is performed by the C-DBMS or by a dispatcher, i.e., a program logic that is responsible for dispatching queries received by said C-DBMS to the accelerator if some conditions are met. Preferentially, each of the source DBMSs comprises or is operatively coupled to a respective dispatcher module.

According to embodiments, two or more of the source-DBMSs respectively are configured to act as a further C-DBMS such that each of the further C-DBMSs is enabled to access a different sub-set of the replicated copies.

For example, a computer system may comprise five source DBMSs representing different subsidiaries of a company. For the marketing tables from all five subsidiaries and corresponding source DBMSs, the first source DBMS becomes the C-DBMS. For the production tables from all five subsidiaries and corresponding source DBMSs, the second source DBMS becomes the C-DBMS. For the legal-affairs tables from all five subsidiaries and corresponding source DBMSs, the third source DBMS becomes the C-DBMS. This may provide for a highly flexible and complex data integration system that does not require any additional data replication as the data replication may already be implemented for increasing data processing speed. In case the system is implemented primarily for data integration purposes, the system may be beneficial in that without any additional data replication, the option for accelerated query execution for queries addressing only the data content of a particular source DBMS is provided.

An "accelerator" as used herein is an electronic system (e.g. a piece of software, hardware or combination thereof) designed to allow the querying of data managed by the accelerator in a particularly fast manner. An accelerator system may be a standalone DBMS coupled to one or more other DBMSs or may be a module or plug-in of a local DBMS that is operatively coupled to one or more remote DBMSs. The analyzer is configured to retrieve data, e.g. table copies, from said other DBMSs and to execute queries that have been dispatched to the accelerator by the other DBMSs on the data provided by the respective DBMS. According to embodiments, an accelerator does not represent a complete DBMS on its own. For example, it may lack an SQL interface for directly receiving queries from a client application and rather may be configured to receive and execute only queries having been dispatched by one of the other DBMSs. Thus, an accelerator is an accessory system that may largely comprise the functionality of a conventional DBMS, e.g. a query optimizer, a catalogue, a database, etc., but is configured to receive data and dispatched queries from other DBMSs and is configured to execute the dispatched queries in a particular manner that differs from the manner the query would be executed by the other DBMSs.

For example, an accelerator such as Netezza may be an asymmetric massively parallel processor (AMPP) appliance with a database "façade" on its front end, whereby only a DBMS that is operatively coupled to the accelerator may be allowed to access said "façade". Except from said database-like façade that is visible only to the coupled DBMSs, the accelerator may be organized internally completely different than a conventional DBMS. However, it is also possible that it is organized like a conventional DBMS that hides its SQL interface from outside queries. The other, operatively coupled DBMSs, also referred herein as source DBMSs, can be, for example, IBM DB2 for z/OS, Oracle, PostgreSQL, MySQL DBMS or the like.

A "database" as used herein is an information structure, which comprises one or more data containers, in particular database tables, the use of which is controlled by a database management system. The database may be a relational database, an object oriented database, or any other kind of database. Accordingly, the DBMS may be a relational DBMS, an object oriented DBMS, an OLAP DBMS, an OLTP DBMS, or any other kind of DBMS. A DBMS may be optimized for performing a particular kind of database query, e.g. OLTP queries or OLAP queries, quickly.

A "database management system" (DBMS) as used herein is a system designed to allow the definition, creation, querying, update, and administration of a database. A DBMS may be, for example, a row-oriented or column-oriented DBMS. According to embodiments, a DMBS is a system comprising one or more databases, a query planner and at least one interface for receiving queries from one or more client application. The interface may be a standard SQL interface.

A "C-DBMS" as used herein is a DBMS that provides consolidated access to data contained in multiple source databases, whereby said source databases comprise one or more databases managed by the C-DBMS and comprises complete or partial copies of one or more remote databases managed by other DBMSs. Said other DBMSs are herein also referred to as "owning" DBMSs or "O-DBMSs". The copies of the other databases are stored in an accelerator. The C-DBMS provides the consolidated access to one or more client applications, e.g. via a network such as the internet.

An "Owning DBMS" or "O-DBMS" as used herein is a DBMS that manages a source database comprising a table that is replicated to an accelerator. To the contrary, a C-DBMS references the remote copy of said table in read-only mode, i.e., has READ but not WRITE access to the copy of said table in the accelerator. For a selected source DBMS to become an O-DBMS, the C-DBMS is granted READ access to the table copy in the accelerator and receives a reference to the table copy in the accelerator. The receiving of the reference can be triggered by the C-DBMS by calling an SP of the accelerator which updates the metadata catalogue of the C-DBMS with all missing information relating to tables of the accelerator for which the C-DBMS has received a READ permission. The C-DBMS is configured to evaluate table metadata in the catalogue of the C-DBMS for accelerator-only-tables provided by remote O-DBMSs for rewriting database queries received from one or more client applications such that the query can be dispatched to the accelerator for aggregating data stored in accelerated tables of the C-DBMS and stored in table copies provided by one or more remote O-DBMSs to the accelerator.

Accordingly, a "C-database" is a database managed by the C-DBMS whose data is made accessible to one or more client applications in a consolidated, integrated manner together with data received by an accelerator from one or more other, remote source databases (referred herein also as "O-databases").

A "source database" as used herein is a database. A source database can act, depending on the configuration of the distributed system and the accelerator, as a data source for one or more remote DBMSs (C-DBMSs) via an accelerator and/or for the managing local DBMS.

A "query" as used herein is a request that can be interpreted and executed by a DBMS. In particular, a query is a request specified in a data manipulation language (DML), (for example SQL SELECTS, INSERTS, UPDATES, DELETES). The INSERT, for example, could be a nested query comprising a sub-query, whereby the sub-query is a SELECT that retrieves some data that is INSERTed to a target table or column by the rest of the nested query. The sub-query with the SELECT may be dispatched to the accelerator for triggering the insertion of the retrieved data into an accelerator-only-table.

"Metadata" as used herein is data that is descriptive of some features of a data object, e.g. a database table, but is not descriptive of the data that is stored in said data object. For example, metadata may comprise a name such as "employee", "ID", "salary" of a database table or namespace of a database table. A namespace is a prefix, e.g. "employee_" that is reserved for a set of data tables having a name staring with said prefix, e.g. "employee_1", "employee_2", . . . "employee_35". The metadata may comprise an indication of the number and names of the columns of a table or view and may comprise constraints of the table or of individual columns of said table, e.g. unique constraints, foreign key constraints, default values for particular columns, a specification of the type or maximal size of data to be stored in a particular column, or the like.

A "distributed system" as used herein is a data processing system comprising multiple software- or hardware-based components which are hosted on multiple different data processing devices which are connected to each other via a network.

A "catalogue" or "database catalogue" as used herein is a component of a database management system that comprises metadata of database objects. For example, the metadata may comprise definitions of database objects such as database tables, views, synonyms, value ranges, indexes, users, and user groups. The metadata may indicate if a particular table is e.g. a base table, an accelerated table or an accelerator-only table. According to some embodiments, the catalogue is accessible by an SQL standard, e.g. the INFORMATION_SCHEMA, but in some embodiments there may in addition or alternatively exist also database-specific metadata access methods, e.g. for Oracle databases. Typically, the catalogue of a DBMS is accessible only by components of said DBMS, e.g. the query planner, but is not accessible by components of other DBMSs.

A "network" as used herein may be any kind of wireless or wired information network. However, the network is such that it can be implemented to work in a telecommunication system, which is compliant with at least one of the following: TCP/IP, Ethernet, ATM, CDMA, GSM, HSCSD, GPRS, WCDMA, EDGE, Bluetooth, UMTS, WLAN and imode.

A "database connection" is a point-to-point data communication channel over data network between a data processing system acting as a client and a system managing a data source. For example, a client system and a source DBMS may be connected by a database connection. According to another example, the source DBMS may be connected via one or more database connections to the accelerator, whereby the source DBMS acts as a client.

A table that is "published" to the C-DBMS as used herein is a table of a source database which is copied (replicated) to the accelerator and whose copy in the accelerator is accessible to the C-DBMS as a result of re-configuring the accelerator such that access to said table copy is granted to the C-DBMS and as a result of re-configuring the C-DBMS such that the name of the table copy in the accelerator is stored as a reference to said table copy in the C-DBMS.

A "base table" as used herein is a database table managed by a source DBMS coupled to an accelerator, whereby said table is not replicated to the accelerator. Thus, a query that accesses a base table must be executed by the source DBMS on its own database and cannot be dispatched to the accelerator.

An "accelerated table" as used herein is a database table managed by a source DBMS coupled to an accelerator, whereby said table is replicated to the accelerator. Thus, there exists a copy of said table in the accelerator. A query that accesses an accelerated table can be executed by the source DBMS on its own database and can also be dispatched to the accelerator (if the query does not access a base table).

An "accelerator only table" as used herein is a database table managed by the accelerator to which a source DBMS is coupled. The source DBMS does not comprise the accelerator only table in one of the source databases managed by said source DBMS. Thus, a query that accesses an accelerator only table must be dispatched by the source DBMS to the accelerator (if the query accesses an accelerator only table and a base table, an error may be returned).

Referring now to the Figures in detail, FIG. 1 depicts multiple different source databases "DB F", "DB G" and "DB H" and their respective table copies stored in an accelerator. The "copied instance" of the source database DB F that is stored in the accelerator is labeled "DB F'". The "copied instance" of the source database DB G that is stored in the accelerator is labeled "DB G'". The "copied instance" of the source database DB H that is stored in the accelerator is labeled "DB H'". For example, each of the source DBMSs may be a respective DB2 system. The source databases may be separated from each other because they represent different subparts of an organization (different lines-of-business, "LOB"). For example, the source databases may be isolated from each other by using different regional tables (for different regional branches of an organization) for different DB2 systems. The data of one or more tables of all source systems are accelerated into the same accelerator.

In FIG. 1A, the accelerator and each of the source DBMSs have standard configuration. The standard configuration implies that each of the table copies in the accelerator can only be accessed by the source DBMS comprising and managing the source database table from which said copy was derived. Thus, the copies of the source databases DB F, G and H are isolated from other source databases managed by the same accelerator. For example, source DBMS "F" is allowed to select all table copies stored in "DB F'" but is not allowed to access and select or even recognize the existence of tables in the accelerator which belong to database copies "DB G'" or "DB H'". For example, if DB2 in standard configuration is used as a source DBMS, DB2 does not allow a single query to reference and access accelerated tables from different DB2 source DBMSs.

Figure 1B:
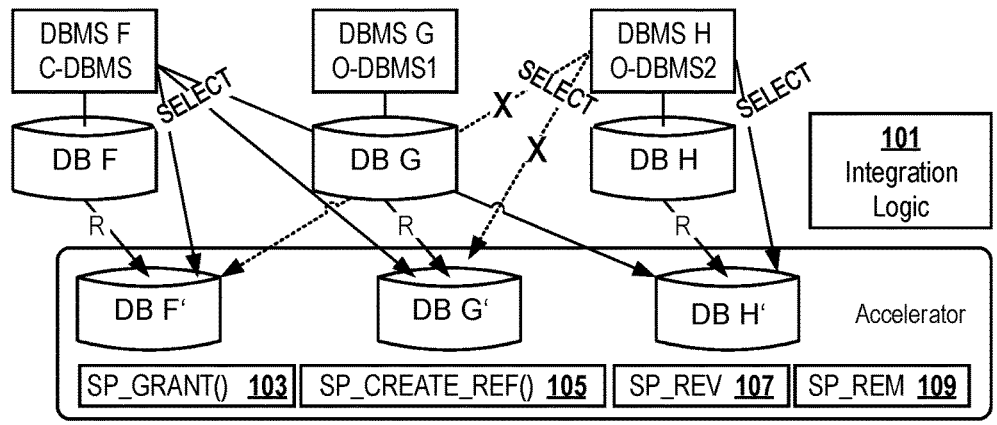
FIG. 1B depicts a re-configured accelerator that allows a C-DBMS to access table copies of multiple source databases in accordance with an embodiment of the present invention.

FIG. 1B depicts a re-configured accelerator and a re-configured F DBMS acting as a C-DBMS, whereby the C-DBMS is enabled to access table copies of multiple source databases and thus is enabled to provide centralized, consolidated access to the data of multiple source DBMSs. The source DBMSs "G" and "H", also referred to as "owning (O) DBMSs", still have standard-configuration and are thus not able to access table copies of other source DBMSs in the accelerator. Thus, the "owner DBMS" DBMS H can access table copies of DB H' in the accelerator but not table copies of DB G' and DB F'. The "owner DBMS" DBMS G can access table copies of DB G' in the accelerator but not table copies of DB H' and DB F'. The "C-DBMS" DBMS F can access table copies of DB G', DB H' and DB F' in the accelerator.

According to embodiments, the accelerator comprises two new types of stored procedures (SPs) 103, 105 which are called for re-configuring the distributed system of FIG. 1A such that the system is transformed into the data integration system comprising a consolidated C-DBMS depicted in FIG. 1B. The re-configuration comprises the following steps: at first, one of the source DBMS is automatically or manually selected to act as the consolidated C-DBMS and to provide centralized, consolidated access to data of multiple source DBMS. The selection may be performed, for example, by a user via a GUI that is generated by the accelerator or another piece of program logic. Alternatively, one of the source DBMS may be selected automatically or via a configuration file to act as the C-DBMS. The GUI may be generated by a program logic 101 that interoperates with the accelerators and the source-DBMS for providing the consolidated view in accordance with the source DBMSs and tables selected by a user.

In a next step, one or more other source DBMS and respective source databases are selected which already provide some of their tables as a copy to the accelerator and which shall act as additional data sources for providing the consolidated access via the C-DBMS. For example, a user may select DBMS G and the corresponding database DB G as a data source that is to be integrated by the C-DBMS. DBMSs whose databases are used as data providers for a consolidated, global data access on multiple distributed databases and which do not act as C-DBMS by themselves are in the following referred to as "owning DBMS" or "O-DBMS".

"Access Grant Step":

After the G-DBMS was selected to act as an O-DBMS, the G-DBMS calls the SP_GRANT( ) stored procedure of the accelerator for granting the selected source DBMS (C-DBMS) READ access to all table copies of the tables of the G-DBMS which were copied (accelerated) to the accelerator. The READ access granted does not necessarily include all table copies; a specific subset of the tables can also be specified.

For example, the SP_GRANT( ) stored procedure in the accelerator may be called a first time by the G-DBMS for grating the C-DBMS access to copies of the G-DBMS tables which were copied to the accelerator. The call may comprise the following arguments for a ACCEL_GRANT_TABLES_REFERENCE procedure in the accelerator: ACCEL_GRANT_TABLES_REFERENCE (accelerator, C-DBMS, Set<accelerated-tables-of-DB-G>). Then, the SP_GRANT ( ) stored procedure in the accelerator may be called a second time by the H-DBMS for grating the C-DBMS access to copies of the H-DBMS tables which were copied to the accelerator. The call may comprise the following arguments: ACCEL_GRANT_TABLES_REFERENCE (accelerator, C-DBMS, Set<accelerated-tables-of-DB-H>).

"Create Reference Step":

After the "Access Grant" step, the C-DBMS can access the additional table copies in the accelerator which were provided by the O-DBMSs. However, the table and column names of the table copies in the accelerator may not be suited for executing a single, global query on multiple tables provided by different O-DBMSs. In a further step referred herein as "create reference step", the C-DBMS calls the SP_CREATE_REF( ) stored procedure 105 for each of the O-DBMSs whose table copies in the accelerator are accessible by the C-DBMS.

For example, the C-DBMS calls the SP_CREATE_REF ( ) stored procedure 105 a first time for creating synonyms for all table copy names having been copied from the G-DBMS to the accelerator with the following arguments: ACCEL_CREATE_REFERENCE_TABLES(accelerator, C-DBMS, Set<pair<accelerated-table-in-DB-G, C-DBMS-accelerator-only-table-name>>). For each specified table, this stored procedure will create a synonym in the catalogue of the accelerator that points to the copy of the table received from the G-DBMS and will create a reference to the synonym in the catalogue of the C-DBMS.

The C-DBMS may call the SP_CREATE_REF( ) stored procedure 105 a second time for creating synonyms for all table copy names having been copied from the H-DBMS to the accelerator with the following arguments: ACCEL_CREATE_REFERENCE_TABLES (accelerator, C-DBMS, Set<pair<accelerated-table-in-DB-H, C-DBMS-accelerator-only-table-name>>). For each specified table, this stored procedure will create a synonym in the catalogue of the accelerator that points to the copy of the table received from the H-DBMS and will create a reference to the synonym in the catalogue of the C-DBMS.

For example, the created synonyms acting as references to the original tables can comprise or be stored in association with metadata indicating that the table copies represented by said synonyms are "accelerator only" tables.

According to some embodiments, the arguments of the stored procedures 103, 105, e.g. the set of "accelerated-tables" can be provided by a user via a GUI.

According to embodiments, the accelerator comprises further SPs for revoking access permissions and for removing the synonyms:

The SP SP_REV 107 is configured to remove, upon being called by one of the O-DBMSs, e.g. the H-DBMS, the granted READ access rights of the C-DBMS for table copies of the calling O-DBMS.

The SP SP_REM 109 is configured to remove, upon being called by one of the O-DBMSs, e.g. the H-DBMS, the synonyms stored in the catalogue of the C-DBMS referencing tables of the calling O-DBMS.

Figure 2:
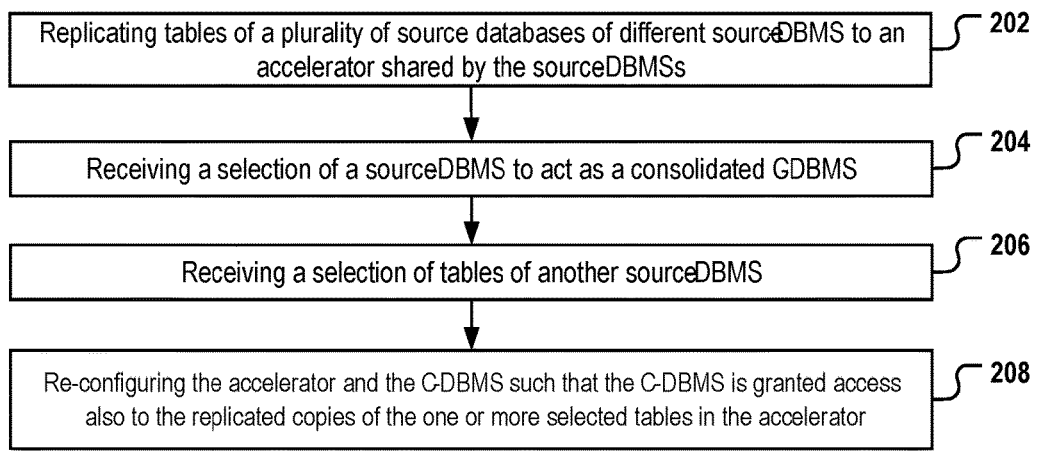
FIG. 2 depicts a flowchart of a method according to one embodiment of the invention.

FIG. 2 depicts a flow chart of a method according to one embodiment of the invention. For example, the method may be executed semi-automatically by components of a distributed system depicted for example in FIG. 1, 3 or 4, and a human user selecting one or more source-DBMSs via a GUI.

Figure 6:
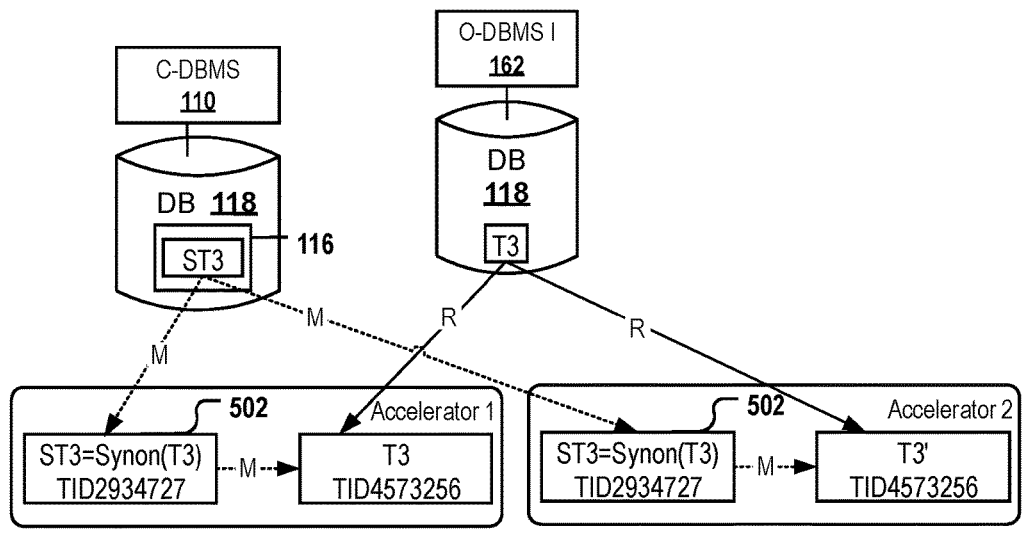
FIG. 6 depicts the use of multiple shared accelerators for increasing system reliability in accordance with an embodiment of the present invention.

In a regularly executed step 202, one or more tables of each of the source databases 118, 166, 192 are replicated (i.e., copied) to a shared accelerator 120 or a plurality of shared accelerators as described in FIG. 6. Each of the source databases is managed by a respective source DBMS 110, 162, 190 respectively being configured to dispatch queries to the shared accelerator 120 for accelerating the execution of the dispatched queries by executing the queries on the replicated table copies rather than on the tables in the respective source database. The accelerator is configured such that the replicated tables of the source databases can only be accessed for executing a dispatched query by the one of the source DBMS which has provided said replicated tables. This may represent the default configuration because typically the source DBMS provide their data to the accelerator in order to accelerate the execution of some types of queries, not for providing a consolidated, integrative view on data derived from many data sources.

In step 204, the integration logic 101 receives a user's selection of a first one of the source DBMSs. For example, the program logic 101 may generate a GUI enabling a user to select one of the source DBMS as C-DBMS and an arbitrary number of other source DBMSs as O-DBMS. Moreover, the GUI may enable a user to select the tables to be copied to the accelerator that are accessible to the C-DBMS. The selected first source DBMS is used as a consolidated DBMS—C-DBMS—for providing the consolidated access. The integration program logic may be a hardware, firmware or software-based module. For example, it can be a software application program or a module of the accelerator.

In step 206, the integration program logic 101 receives a user's selection of one or more of the tables managed by a second one of the source DBMSs. The selection of said tables can comprise an implicit selection of the second source DBMS to act as an ("owned") O-DBMS. In response to receiving the selection of the one or more tables, the program logic 101 alone or in interoperation with a user having performed the selection re-configures the accelerator and the C-DBMS in step 208 such that the C-DBMS is granted access also to the replicated copies of the one or more selected tables in the accelerator. For example, the user or the program logic may cause each of the O-DBMSs to call the SP_GRANT( ) SP and may cause the C-DBMS to call the SP_CREATE_REF( ) SP in order to re-configure the distributed system such that the C-DBMS has access to the tables of all source DBMS that were selected to act as O-DBMS.

Figure 3:
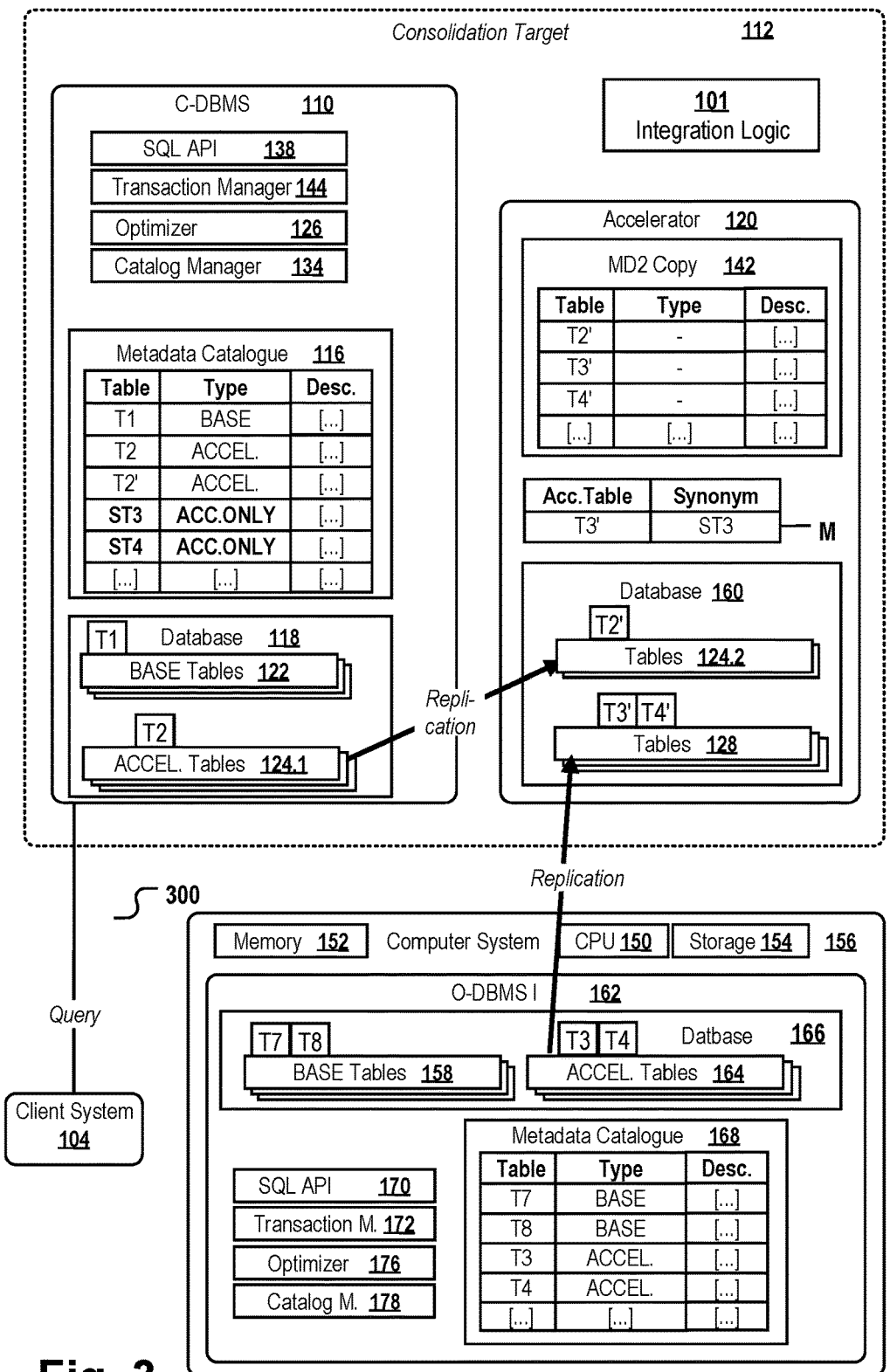
FIG. 3 depicts a computer system comprising a first and a second source DBMS and an accelerator in accordance with an embodiment of the present invention.

FIG. 3 depicts a distributed computer system 300 comprising a first DBMS 110, a second source DBMS 162 and an accelerator 120. The system comprises a program module 101 configured for generating a GUI for enabling a user to select source databases and tables. In the depicted example, the first source DBMS 110 and the accelerator 120 are hosted on a single or distributed computer system (not shown). The second DBMS 162 is hosted on a different computer system 156 comprising main memory 152, one or more CPUs 150, and a non-volatile storage medium 154. The computer system 156 is connected via a network, e.g. the internet or an intranet, to the single or distributed computer system hosting the accelerator and the C-DBMS.

The source-DBMS 110 is selected via the GUI as the DBMS to act as and provide consolidated data access ("C-DBMS"). The C-DBMS comprises: an SQL API 136 enabling one or more client application to send queries for reading or modifying the data of database 118; a transaction manager 144 responsible for managing database transactions performed on tables of the source database 118; an optimizer 126 configured for minimizing or at least reducing the time required for executing a particular database query; a catalog manager 134 for ensuring that a database catalogue 116 is consistent and up-to-date.

Likewise, the second (and any other) source DBMSs 162 comprises the same or similar functional components like the first DBMS: an SQL API 170 enabling one or more client application to send queries for reading or modifying the data of database 166; a transaction manager 172 responsible for managing database transactions performed on tables of the source database 166; an optimizer 176 configured for minimizing or at least reducing the time required for executing a particular database query; a catalog manager 178 for ensuring that a database catalogue 168 is consistent and up-to-date.

The source database 118 comprises multiple tables T1, T2 and others. Some of the tables, e.g. T1, are "base tables" 122, i.e., tables which are not replicated to the accelerator. Some of the tables, e.g. T2, are "accelerated tables" 124.1, i.e., tables which are replicated to the accelerator. For example, the table T2' is the replicated copy of the table T2. The metadata catalogue 116 of the C-DBMS 110 comprises a list of all tables that can be accessed by the C-DBMS directly in the database 118 or in the accelerator and comprises, for each of the tables, metadata. The metadata comprises the type of the table ("base table", "accelerated table" or "accelerator only table") and structural information, e.g. the number, types and names of the columns of a table. The catalogue comprises one or more entries for "accelerator only" tables, i.e., table copies stored in the accelerator but not in the database of the DBMS 110 to which the catalogue belongs. Previously, "accelerator only tables" were tables created by the accelerator for storing intermediate values while performing some analytical steps on data provided by the DBMS comprising the catalogue with the "accelerator only table" entries. To the contrary, according to embodiments of the invention, the "accelerator only tables" identified in the catalogue 116 of the C-DBMS are tables provided by other source databases. For example, tables T3' and T4' are marked in the catalogue 116 as "accelerator only tables" and are provided by source database 166.

Likewise, the catalogue 168 of the other source database 166 comprises metadata indicating that tables T7 and T8 are stored in the source database 166 as base tables and are not replicated to the accelerator for improving performance. However, tables T3 and T4 are "accelerated tables" and a copy T3', T4' 128 of said tables is stored and repeatedly updated in the accelerator.

Figure 4:
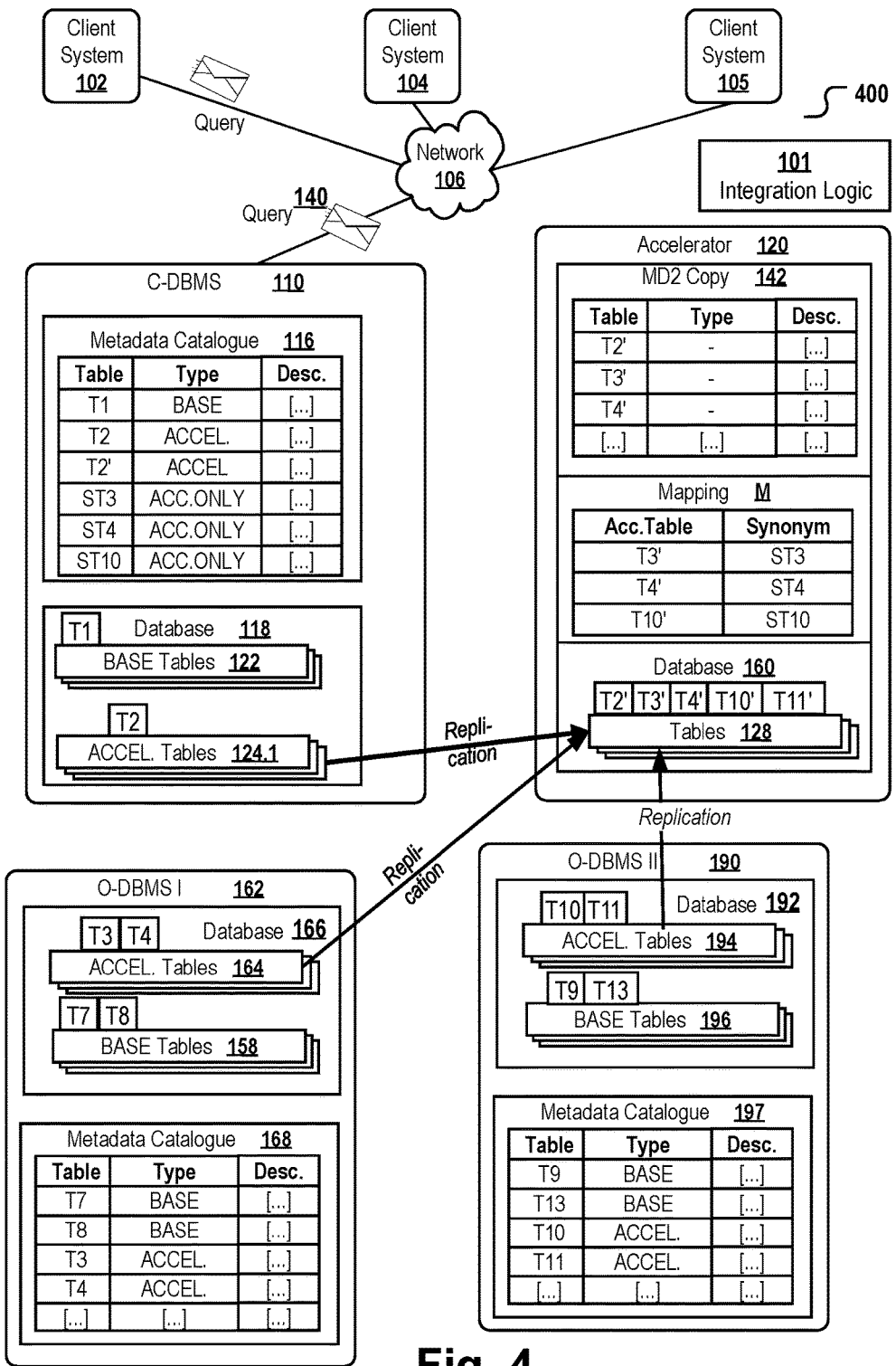
FIG. 4 depicts the computer system of FIG. 3 comprising a further source DBMS in accordance with an embodiment of the present invention.

The accelerator comprises a mapping M of table copy names and synonyms, whereby the synonyms are actually referenced by the catalogue entries of the C-DBMS as "accelerator only tables", not the names of the O-DBMS table copies. An example for the mapping is depicted in FIG. 4 in greater detail: original table name T2 as used by the DBMS 110 corresponds to the table copy name T2' (i.e. the name of the copy of the table T2 used by the accelerator for managing and accessing said table copy). Said name T2' does not need to be mapped to a synonym. Original table name T3 as used by the DBMS 162 corresponds to table copy name T3' used by the accelerator for managing and accessing said table copy T3'. The mapping M comprises a mapping of T3' to the synonym ST3. Original table name T10 as used by the DBMS 197 corresponds to table copy name T10' that is mapped to the synonym ST10.

The computer systems hosting the source DBMSs and the accelerator are connected with each other via a network, e.g. the internet or an Intranet. A client, e.g. a client system 104 or a client application, connects to the one of the source DBMS having been selected as the C-DBMS. The client sends a query to the C-DBMS. The query can refer to a mixture of accelerated tables (e.g. T2) and accelerator only tables (e.g. T3' derived from T3 of O-DBMS 162). For example, the query may comprise the statement: "SELECT * FROM T1, T2, ST3 WHERE . . . ;".

FIG. 4 depicts a distributed computer system 400 comprising a first source DBMS 110, a second source DBMS 162, a third source DBMS 190 and an accelerator 120. The system comprises a program module 101 configured for generating a GUI for enabling a user to select source databases and tables. For example, the first, second and third source DBMSs and the accelerator are respectively hosted on different computer systems (not shown). The source DBMS 110 was selected by an operator of the distributed system 400 as the C-DBMS. The other source DBMSs were selected to act as O-DBMS. The computer systems are connected via a network, e.g. the internet or an intranet. One or more client systems 102, 104, 106 can send queries 140 to the source DBMSs 110, 162, 190, but in the depicted example, only the C-DBMS 110 will be able to integrate data of the other DBMSs and provide the client with a consolidated view on the distributed data.

The O-DBMS 190 comprises a catalogue 197 specifying the structure of several base tables T9, T13 and accelerated tables T10, T11 which are replicated to the accelerator to ensure that some queries received by the source DBMS 190 can be dispatched for (faster) execution to the accelerator. The components of the other source DBMSs 110, 162 correspond to the components having been described already for FIG. 3.

As the C-DBMS has only READ access to the table copies ST3, ST4, ST10 provided by other DBMSs and labeled as "accelerator only tables" in the catalogue of the C-DMBS, any received query comprising an INPUT, UPDATE or DELETE statement addressing one of said tables will not be dispatched by the C-DBMS to the accelerator or will cause the accelerator to return an error message as the C-DMBS is not authorized. An INPUT, UPDATE or DELETE statement can use an accelerator-only table as the target of the insert/update/delete statement and have a subselect part that refers to ST, ST, ST10 in read-only mode. An example would be a query like "INSERT INTO AOT1 SELECT * from ST3 JOIN ST4 ON . . . "

According to embodiments, the integration logic 101 generates a GUI that provides a "grant READ access & create reference table dialog" to automate the two GRANT/CREATE operations into a single step, and to select the set of accelerated tables that should be integrated by the selected C-DBMS. According to some embodiments, it is the duty of an administrator of the distributed system to remove/recreate the "accelerator only table" references in the catalogue of the C-DBMS if the table on the owner side (O-DBMS) is dropped or the data type is altered. If an additional column is added to an accelerated table in the respective source database 166, 192, this modification does not need to be propagated to the catalogue of the accelerator and the C-DMBS if the new column is not referenced (the new column is not part of the "accelerator only table" reference).

This may be beneficial as an existing concept of "accelerator only concept" is re-used for a different, new technical functionality, i.e., data integration rather than accelerated query performance. Every table is still locally accessible in the respective O-DBMSs but can in addition be accessed in the accelerator or via the C-DBMS. In a further advantageous aspect, the set of users and their privileges can be different on the C-DMBS and each of the O-DBMSs. The C-DBMS has all tables and their schemas in its own catalog 116 (so query tools can enumerate and explore set of tables available locally as well as remotely in the accelerator). Thus, more queries can be dispatched to the accelerator where they can typically be executed faster.

According to embodiments, the accelerator is hosted on (low-cost commodity) hardware arranged in a massively parallel configuration to achieve orders of magnitude better performance at a cheaper price point for certain workloads than any of the source DBMSs. An example for such a configuration is IBM DB2 Analytics Accelerator for z/OS.

Applications and end users connect to the C-DBMS 110 and send their data manipulation requests (e.g. SQL queries) via a standard SQL interface to the C-DBMS. The C-DBMS has a metadata catalog 116 that contains a table that identifies some tables that are only stored in the local source database 118, some accelerated tables that are replicated to the accelerator, and some tables that are contained in the accelerator but not in the local database 118. When the request is parsed by the optimizer 126, the C-DBMS recognizes the presence of one or more accelerator only tables and forwards the request to the accelerator where the request is processed. The accelerator executes the dispatched query on the copy of a data table provided by a remote O-DBMS 162.

Data from the O-DBMSs can be replicated to the accelerator e.g. in a bulk/batch load or using continuous replication (trickle feed). The O-DBMSs can either directly connect to the accelerator or forward their changes through the C-DBMS.

According to embodiments, data of multiple different tables in multiple different O-DBMS can be replicated to the accelerator according to different mapping schemas. For example, the data of many tables in a source database can be transferred into a single table in the accelerator. For example, regional sales centers may all consolidate their sales transactions into a single target sales transactions table.

Alternatively, the table of each source DBMS may be stored in a respective table in the accelerator. Each source system establishes its own security domain in the accelerator and copies or replicates its source data into a target table in its own security domain in the accelerator. All table copies have the same structure. According to embodiments, the first DBMS comprises a view that, upon being called, retrieves data from all the table copies and combines the data, e.g. by performing a UNION ALL operation, into a single result set.

According to embodiments, the source database of the C-DBMS comprises a view. The view is configured to retrieve, upon being called, data records of two or more tables in the accelerator, said two or more tables having the same table structure and being derived from two or more of the source DBMSs, the data record retrieval comprising performing an SQL operation on the table records of said two or more tables. For example the view may combine the data of the multiple different tables in the accelerator by executing a JOIN, INTERSECT or UNION ALL SQL query or a query in another suitable database language. Thus, data from table copies of multiple source databases can be retrieved in a single request in a single operation.

The use of a shared table structure is particularly advantageous for the UNION ALL and INTERSECT operations and respective views. For views comprising a JOIN operation, the tables in the accelerator can have different structure and different semantics. Thus, a view may represent a report that aggregates data from multiple accelerator tables representing the same semantic concept (e.g. goods produced in several different subsidiaries of a company) and data from table representing different semantic concepts (e.g. employee vs. order or goods-produced). A typical example for such a report view would be a view that reports the number of products generated under the responsibility of an employee who manages multiple subsidiaries. In case the integrated tables of the source databases do not have a common schema, some data transformation may be executed, e.g. by the accelerator or a replication module, to consolidate the data into a common schema.

For example, the C-DBMS receiving a query can parse the query in multiple steps. In the first step the query is parsed for correct syntax. The syntax checking comprises evaluating whether all referenced database objects (e.g. tables) are contained in the database catalog of C-DBMS. For example, the view referenced by the query must be defined in C-DBMS. Then, a privilege check is performed which comprises determining whether the user or client application having submitted the query has the necessary privileges (authorizations) according to rules defined in C-DBMS. If so, the query that is resolved by transforming the SQL commands in the view of the C-DBMS that is referenced by the query into a query that references the real tables that are defined in the view definition—in other words the query contained in the view definition is "merged" with the query referencing the view. The result of this transformation is a query that does no longer reference the view but the set of base tables, accelerated tables or accelerator-only tables that are contained in the view definition and the other parts of the query outside of the view reference. As a result, a query is generated that does not comprise a reference to a view and merely comprises references to tables. This query is then processed according to the acceleration and consolidation eligibility rules to determine whether the query can be sent to the accelerator (no base table is referenced) or must be sent to the accelerator (at least one accelerator-only table is referenced)—or cannot be processed at all (both a base table and an accelerator-only table are referenced).

According to one example, a customer has regional centers with several distributed source DBMSs and wants a consolidated view in the DBMS located in the headquarters of the customer ("MAIN DBMS"). The data should be consolidated without first storing it in the MAIN-DBMS and should be accessible thru the MAIN-DBMS from existing client applications for the MAIN-DBMS. To achieve this goal, a single accelerator, e.g. IBM's IDAA, is connected with all source DBMSs and the MAIN DBMS. The Main-DBMS is selected as the C-DMBS, the other DBMSs are used as the O-DBMSs. Then, copies of one or more tables of each connected source DBMS—including the MAIN-DBMS-are transferred to and stored in the accelerator (e.g. table copies of DB-MAIN, DB-NORTH and DB-SOUT). A pairing is established between semantically equivalent table copies and their names, e.g. of table T1N of DB-North and table T1S of DB-South.

For example, the content from table T1N of DB-North is copied into table T1N in the accelerator and the content from table T1S of DB-South is copied into table T1S in the accelerator.

In case the C-DBMS receives a query "SELECT * from DB-NORTH.SCHEMA1.T1N", the query is rewritten by the C-DBMS into "SELECT * from Accelerator.SCHEMA2.T1N".

In case the C-DBMS receives a query "SELECT * from DB-NORTH.SCHEMA.T1N UNION ALL SELECT * FROM DB-SOUTH.SCHEMA.T1S", the query is rewritten by the C-DBMS into "SELECT * from ACCELERATOR.SCHEMA.T1N UNION ALL SELECT * FROM ACCELERATOR. SCHEMA. T1S".

In a further step, the C-DBMS creates a view according to "CREATE VIEW T1 VIEW AS SELECT * from DB-NORTH.SCHEMA.T1N UNION ALL SELECT * FROM DB-SOUTH.SCHEMA.T1S".

In case the C-DBMS receives a query "SELECT * from DB-NORTH.SCHEMA.T1N UNION ALL SELECT * FROM DB-SOUTH.SCHEMA.T1S", the query is rewritten by the C-DBMS into "SELECT * from VIEW T1_VIEW".

According to some embodiments, highly complex transformations can be performed by the accelerator. The complexity of transformations supported is only limited by the expressiveness of the data manipulation language supported by the accelerator. For example, the following statements 1-4:

1. CREATE TABLE AOT_T1( . . . ) IN ACCELERATOR A1;
2. INSERT INTO AOT_T1 SELECT * from DB-NORTH.SCHEMA.T1N
3. INSERT INTO AOT_T1 SELECT * from DB-SOUTH.SCHEMA.T1S
4. SELECT * from AOT_T1; (in accelerator A1)

can be re-written by the C-DBMS into statements 5-8 as follows:

5. CREATE TABLE AOT_T1_UID_01_02( . . . )
6. INSERT INTO AOT_T1_UID_01_02 SELECT * from ACCELERATOR.SCHEMA.T1N
7. INSERT INTO AOT_T1_UID_01_02 SELECT * from ACCELERATOR.SCHEMA.T1S
8. SELECT * FROM AOT_T1_UID_01_02

Figure 5:
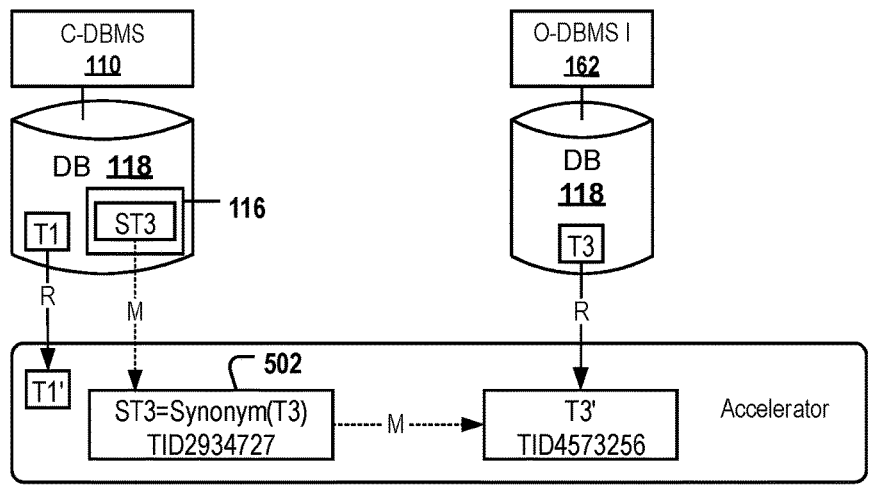
FIG. 5 depicts the use of "synonyms" for resolving table names in accordance with an embodiment of the present invention.

FIG. 5 depicts the use of "synonyms" for resolving table names. According to some embodiments, an administrator or an integration logic calls, in response to the selection of a table of an O-DBMS 162 to be integrated by the C-DMBS 110, a first stored procedure 103 stored in the accelerator that grants the C-DBMS read access to a copy T3' of a table T3 and/or calls a second stored procedure 105 that creates a reference in the catalogue 116 of the C-DBMS 110 to the synonym ST3 of the table copy T3' in the accelerator. The first and second SPs are executed by the accelerator.

The first SP comprises, for example, the following SQL command: ACCEL_GRANT_TABLES_REFERENCE (ACCEL1, C-DBMS, Set<T3>); the call of the second SP grants the C-DBMS read access to table copy T3' via the reference ST3 in the catalogue of the C-DBMS. According to one embodiment, the reference ST3 refers to a synonym ST3 of the copy T3' of the table T3. For example, the original table name of the table in an O-DBMS 118 may be T3, the name of the table copy in the accelerator may be T3', and the synonym for said copy may be ST3. The C-DBMS stores a reference to the synonym ST3, ST10, ST11, etc. of each table copy T3', T10', T11' derived from one of the O-DBMSs in its internal catalogue.

For example, the C-DBMS receives a query SELECT T1.C1, T3.C2 FROM T1, O-DBMS162.SCHEMA1.T3. In response to receiving the query, the C-DBMS (e.g. via its optimizer) resolves the three-part name O-DBMS162.SCHEMA1.T3 in the query to T3' on the accelerator. The name resolution is performed by accessing a mapping M which is stored in the accelerator. Some current query rewriting and dispatching routines only support two-part names. By using an additional mapping M in the accelerator, two-part names in the rewritten query can be used for identifying a synonym mapped to the two-part name in the rewritten query. The synonym may follow a three-part-name syntax. By introducing an additional mapping in form of synonyms, it is possible to combine query rewrite engines of C-DBMS and accelerators which use different naming conventions for table names, e.g. a two-part and a three-part naming convention. For example, the two-part name C-DBMS.ST3 referenced in the rewritten query is resolved to the 3-part name within the accelerator O-DBMS162.SCHEMADBMS162.T3' that allows a cross-database query in the accelerator. Using a table name mapping M and respective synonyms may have the advantage that the T3' metadata does not to be materialized in the C-DBMS catalog but is instead retrieved dynamically at run-time from the O-DBMS.

FIG. 6 depicts the use of multiple shared accelerators for increasing system reliability. In a high-availability setup, each O-DBMS and the C-DBMS are connected to at least two shared accelerators. The O-DBMS 162 loads its accelerated tables, e.g. T3 into both accelerators (Accel1 and Accel2). In the catalogue of the C-DBMS 110, a single reference T3' for an accelerated only table points to both accelerators (Accel1 and Accel2).

The system of FIG. 6 is created by re-configuring the accelerator and the C-DBMS and in particular, the respective catalogues. The re-configuration may be performed by performing the following operations:

The source-DBMS selected to act as O-DBMS 162 calls the ACCEL_GRANT_TABLES_REFERENCE SP in the accelerator with the following arguments: ACCEL_GRANT_TABLES_REFERENCE (ACCEL1, C-DBMS, Set<acceleratedtables>). The set of accelerated tables comprises the table name T3.

In addition, the source-DBMS selected to act as O-DBMS 162 calls the ACCEL_GRANT_TABLES_REFERENCE SP in the accelerator with the following arguments: ACCEL_ GRANT_TABLES_REFERENCE (ACCEL2, C-DBMS, Set<acceleratedtables>). The set of accelerated tables comprises the table name T3.

The C-DBMS selected to act as C-DBMS 110 calls the ACCEL_CREATE_REFERENCE_TABLES SP in the accelerator with the following arguments: ACCEL_CREATE_REFERENCE_TABLES (ACCEL1, C-DBMS, Set<pair<accelerated-table-on-O-DBMS, C-DBMS-accelerator-only-table-name>>). In case of the table T3 having a copy T3' in the accelerator for which a reference to a synonym ST3 of said copy shall be created in the catalogue 116 of the C-DBMS, this call would look like: ACCEL_CREATE_REFERENCE_TABLES (ACCEL1, C-DBMS, Set<pair<T3', ST3>>). This will create a mapping M in the catalogue of each of the accelerators will create a reference in the catalogue of the C-DBMS to the synonym ST3 of the copy T3' of the table T3 stored in the O-DBMS from which the copy T3' is derived. The short table names and synonyms T3/T3'/ST3 are used for illustrative purposes only. In fact, the table names may comprise a more complex identifier, e.g. a number with multiple digits, to avoid name space collisions.

Likewise, a mapping M in the second accelerator accel2 can be generated by the C-DBMS calling a stored procedure of the accelerator with the following arguments: ACCEL_CREATE_REFERENCE_TABLES (ACCEL2, C-DBMS, Set<pair<accelerated-table-on-O-DBMS, C-DBMS-accelerator-only-table-name>>). In case of the replicated table T3, this call would look like: ACCEL_CREATE_REFERENCE_TABLES (ACCEL2, C-DBMS, Set<pair<T3', ST3>>).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for providing consolidated access to data of a plurality of source databases, the computer program product comprising a computer readable storage medium having program code embodied therewith, the program code comprising the programming instructions for:
    replicating one or more tables of each of the source databases to a shared accelerator, each of the source databases being managed by a respective source DBMS configured to dispatch queries to the shared accelerator for accelerating the execution of the dispatched queries by executing the queries on the replicated table copies rather than on the tables in the respective source database, the shared accelerator being configured such that the replicated tables of the source databases can only be accessed for executing a dispatched query by the one of the source DBMS which has provided said replicated tables;
    receiving a user's selection of a first one of the source DBMSs, the selected first source DBMS to be used as a consolidated DBMS—C-DBMS—for providing the consolidated access;
    receiving a user's selection of one or more of the tables managed by a second one of the source DBMSs; and
    in response to receiving the selection of the one or more tables, re-configuring the shared accelerator and the C-DBMS such that the C-DBMS is enabled to access also to the replicated copies of the one or more selected tables in the shared accelerator.

2. The computer program product as recited in claim 1, wherein the program code further comprises the programming instructions for:
    receiving a user's selection of one or more of the tables managed by a third one of the source DBMSs; and
    in response to receiving the selection of the one or more tables managed by the third DBMS, re-configuring the shared accelerator and the C-DBMS such that the C-DBMS is enabled to access also to the replicated copies of the one or more selected tables of the third DBMS in the shared accelerator.

3. A system, comprising:
    a memory for storing a computer program for providing consolidated access to data of a plurality of source databases; and
    a processor coupled to the memory, wherein the processor is configured to execute the program instructions of the computer program comprising:
        replicating one or more tables of each of the source databases to a shared accelerator, each of the source databases being managed by a respective source DBMS configured to dispatch queries to the shared accelerator for accelerating the execution of the dispatched queries by executing the queries on the replicated table copies rather than on the tables in the respective source database, the shared accelerator being configured such that the replicated tables of the source databases can only be accessed for executing a dispatched query by the one of the source DBMS which has provided said replicated tables;
        receiving a user's selection of a first one of the source DBMSs, the selected first source DBMS to be used as a consolidated DBMS—C-DBMS—for providing the consolidated access;

receiving a user's selection of one or more of the tables managed by a second one of the source DBMSs; and in response to receiving the selection of the one or more tables, re-configuring the shared accelerator and the C-DBMS such that the C-DBMS is enabled to access also to the replicated copies of the one or more selected tables in the shared accelerator.

4. The computer program product as recited in claim 1, wherein the replication of the one or more tables of the plurality of source databases being performed automatically and regularly.

5. The computer program product as recited in claim 1, wherein the replication of the one or more tables of the plurality of source databases being performed incrementally.

6. The computer program product as recited in claim 1, wherein the one or more tables of each of the source databases being replicated to each of a plurality of shared accelerators, wherein each of the source DBMSs being configured to dispatch queries to the one of the shared accelerators which is flagged as "available" or which is determined to have the lowest workload, wherein each of the shared accelerators being configured such that the replicated tables of the source databases in said shared accelerator can only be accessed for executing a dispatched query by the one of the source DBMS which has provided said replicated tables, wherein the program code further comprises the programming instructions for:

in response to receiving the selection of the one or more tables, re-configuring each of the shared accelerators such that the C-DBMS is granted access also to the replicated copies of the one or more selected tables in said shared accelerator.

7. The computer program product as recited in claim 1, wherein the shared accelerator comprises a first stored procedure, wherein the re-configuration of the shared accelerator comprises:

in response to receiving the selection of the one or more tables, causing the second source DBMS which comprises at least one of the selected tables to call the first stored procedure, the called first stored procedure granting the C-DBMS READ access to copies of the selected tables of said second source DBMS in the shared accelerator, the call of the first stored procedure comprising a name of the shared accelerator, a name of the C-DBMS and the names of the tables to which the READ access is to be granted.

8. The computer program product as recited in claim 1, wherein the shared accelerator comprises a second stored procedure, wherein the re-configuration of the C-DBMS comprises:

in response to receiving the selection of the one or more tables, causing the first source DBMS call the second stored procedure, the called second stored procedure generating a synonym for each replicated copy of one of the selected tables that is stored in the shared accelerator and storing a reference to said synonym in a catalogue of the first source DBMS.

9. The computer program product as recited in claim 1, wherein at least a first one of the tables of the source database of the first source DBMS and at least a first one of the tables of the selected second source DBMS having the same table structure, wherein the replication comprising copying data records of the at least one first table of the first DBMS and data records of the at least one first table of the second source DBMSs into the same table in the shared accelerator or copying the data records into multiple tables in the shared accelerator which share the same table structure, wherein each of the source DBMSs being configured to dispatch queries to the one of the shared accelerators which is flagged as "available" or which is determined to have the lowest workload, wherein each of the shared accelerators being configured such that the replicated tables of the source databases in said shared accelerator can only be accessed for executing a dispatched query by the one of the source DBMS which has provided said replicated tables, wherein the program code further comprises the programming instructions for:

in response to receiving the selection of the one or more tables, re-configuring each of the shared accelerators such that the C-DBMS is granted access also to the replicated copies of the one or more selected tables in said shared accelerator.

10. The computer program product as recited in claim 1, wherein at least a second one of the tables of the source database of the first source DBMS and at least a second one of the tables of the selected second source DBMS having similar table structure, wherein the replication comprises copying data records of the at least one second table of the first DBMS and data records of the at least one second table of the second source DBMSs into one or more tables in the shared accelerator, the one or more tables having a particular table structure, the copying comprising transforming the structure of the data records of one or all of the at least two second tables into the particular table structure.

11. The computer program product as recited in claim 1, wherein the replication comprises copying data records of at least one third table of the first DBMS into a respective, structurally identical copy of said third table in the shared accelerator, and copying data records of the at least one third table of the second source DBMSs into a respective, structurally identical copy of said third table in the shared accelerator.

12. The system as recited in claim 3, wherein the replication of the one or more tables of the plurality of source databases being performed automatically and regularly.

13. The system as recited in claim 3, wherein the replication of the one or more tables of the plurality of source databases being performed incrementally.

14. The system as recited in claim 3, wherein the program instructions of the computer program further comprise:

receiving a user's selection of one or more of the tables managed by a third one of the source DBMSs; and in response to receiving the selection of the one or more tables managed by the third DBMS, re-configuring the shared accelerator and the C-DBMS such that the C-DBMS is enabled to access also to the replicated copies of the one or more selected tables of the third DBMS in the shared accelerator.

15. The system as recited in claim 3, wherein the one or more tables of each of the source databases being replicated to each of a plurality of shared accelerators, wherein each of the source DBMSs being configured to dispatch queries to the one of the shared accelerators which is flagged as "available" or which is determined to have the lowest workload, wherein each of the shared accelerators being configured such that the replicated tables of the source databases in said shared accelerator can only be accessed for executing a dispatched query by the one of the source DBMS which has provided said replicated tables, wherein the program instructions of the computer program further comprise:

in response to receiving the selection of the one or more tables, re-configuring each of the shared accelerators such that the C-DBMS is granted access also to the replicated copies of the one or more selected tables in said shared accelerator.

16. The system as recited in claim 3, wherein the shared accelerator comprises a first stored procedure, wherein the re-configuration of the shared accelerator comprises:
in response to receiving the selection of the one or more tables, causing the second source DBMS which comprises at least one of the selected tables to call the first stored procedure, the called first stored procedure granting the C-DBMS READ access to copies of the selected tables of said second source DBMS in the shared accelerator, the call of the first stored procedure comprising a name of the shared accelerator, a name of the C-DBMS and the names of the tables to which the READ access is to be granted.

17. The system as recited in claim 3, wherein the shared accelerator comprises a second stored procedure, wherein the re-configuration of the C-DBMS comprises:
in response to receiving the selection of the one or more tables, causing the first source DBMS call the second stored procedure, the called second stored procedure generating a synonym for each replicated copy of one of the selected tables that is stored in the shared accelerator and storing a reference to said synonym in a catalogue of the first source DBMS.

18. The system as recited in claim 3, wherein at least a first one of the tables of the source database of the first source DBMS and at least a first one of the tables of the selected second source DBMS having the same table structure, wherein the replication comprising copying data records of the at least one first table of the first DBMS and data records of the at least one first table of the second source DBMSs into the same table in the shared accelerator or copying the data records into multiple tables in the shared accelerator which share the same table structure, wherein each of the source DBMSs being configured to dispatch queries to the one of the shared accelerators which is flagged as "available" or which is determined to have the lowest workload, wherein each of the shared accelerators being configured such that the replicated tables of the source databases in said shared accelerator can only be accessed for executing a dispatched query by the one of the source DBMS which has provided said replicated tables, wherein the program instructions of the computer program further comprise:
in response to receiving the selection of the one or more tables, re-configuring each of the shared accelerators such that the C-DBMS is granted access also to the replicated copies of the one or more selected tables in said shared accelerator.

19. The system as recited in claim 3, wherein at least a second one of the tables of the source database of the first source DBMS and at least a second one of the tables of the selected second source DBMS having similar table structure, wherein the replication comprises copying data records of the at least one second table of the first DBMS and data records of the at least one second table of the second source DBMSs into one or more tables in the shared accelerator, the one or more tables having a particular table structure, the copying comprising transforming the structure of the data records of one or all of the at least two second tables into the particular table structure.

20. The system as recited in claim 3, wherein the replication comprises copying data records of at least one third table of the first DBMS into a respective, structurally identical copy of said third table in the shared accelerator, and copying data records of the at least one third table of the second source DBMSs into a respective, structurally identical copy of said third table in the shared accelerator.

* * * * *